US 12,130,815 B2

(12) United States Patent
Piatetsky et al.

(10) Patent No.: US 12,130,815 B2
(45) Date of Patent: Oct. 29, 2024

(54) SYSTEM AND METHOD FOR PROCESSING DATA FOR ELECTRONIC SEARCHING

(71) Applicant: Castellum.AI, New York, NY (US)

(72) Inventors: Peter Piatetsky, New York, NY (US); Julian Vasilkoski, Brookline, MA (US); Christopher Sullivan, Newton, MA (US)

(73) Assignee: Castellum.AI, New York, NY (US)

( * ) Notice: Subject to any disclaimer, the term of this patent is extended or adjusted under 35 U.S.C. 154(b) by 168 days.

(21) Appl. No.: 17/397,101

(22) Filed: Aug. 9, 2021

(65) Prior Publication Data

US 2022/0050838 A1 Feb. 17, 2022

Related U.S. Application Data

(60) Provisional application No. 63/064,239, filed on Aug. 11, 2020.

(51) Int. Cl.
*G06F 16/00* (2019.01)
*G06F 16/2455* (2019.01)
*G06F 16/33* (2019.01)
*G06N 20/00* (2019.01)

(52) U.S. Cl.
CPC ........ *G06F 16/2455* (2019.01); *G06F 16/334* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 9,912,547 B1* | 3/2018 | Douberley | H04L 43/04 |
| 10,339,468 B1* | 7/2019 | Johnston | G06N 20/20 |
| 11,809,506 B1* | 11/2023 | Paiz | H04L 67/02 |
| 2011/0191373 A1* | 8/2011 | Botros | G06F 16/9038 |
| | | | 707/E17.014 |
| 2016/0267082 A1* | 9/2016 | Wong | G06F 16/164 |
| 2024/0054406 A1* | 2/2024 | Bhise | G06F 18/217 |

OTHER PUBLICATIONS

U.S. Department of the Treasury, "OFAC Enters into $1,400,301.40 Settlement with Payoneer Inc. for Apparent Violations of Multiple Sanctions Programs," Enforcement Release Jul. 23, 2021, https://home.treasury.gov/system/files/126/20210723_payoneer_inc.pdf.

* cited by examiner

*Primary Examiner* — Thu Nguyet T Le
(74) *Attorney, Agent, or Firm* — Schmeiser, Olsen & Watts LLP; Timothy P. Collins

(57) ABSTRACT

A system and method for labelling, categorizing, structuring, and enriching unstructured data is disclosed. First, raw data is received, and a checksum is calculated and compared with an existing checksum. The raw data is downloaded to an object storage, wherein it is then parsed and transmitted to a sanity check system. The sanity checked data is then loaded into a staging database and a stability check is performed. The stability checked data is then loaded into a master database and transmitted to a search platform. Post checks are performed, and a report is generated, followed by the system updating the watchlist checksum.

11 Claims, 16 Drawing Sheets

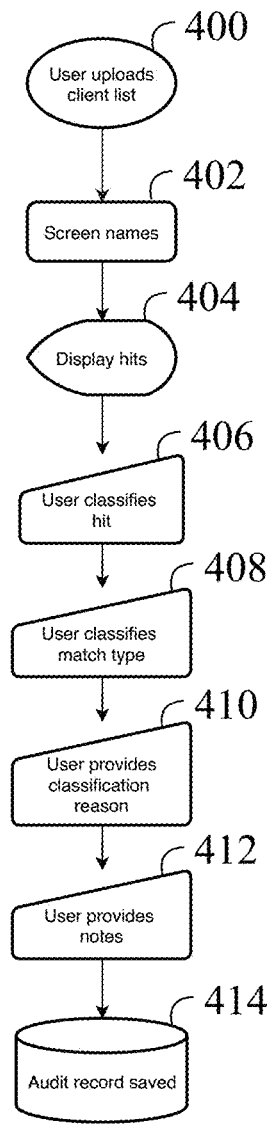
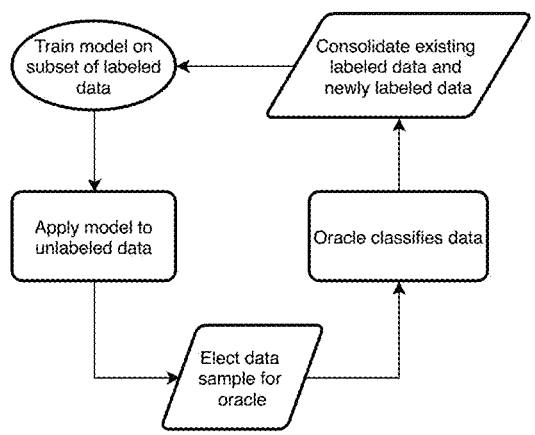
FIG. 4
FIG. 5

United Nations List Source
Original issues and enrichment highlighted
(same terrorist as previous slide)

- XML file, ID has its own field, but is populated by additional text that makes the actual ID unsearchable.

What data looks like on Castellum.AI
Original issues and enrichment highlighted

FIG. 10

What data looks like on UK OFSI Consolidated Sanctions List — 1102

Name: Paek Ma | Type: Entity
Other information: (IMO number 9066978). Annex XIV, [UN ] Listing (formerly temporary listing, in accordance with the Policing and Crime Act 2017). DPRK vessel M/V PAEK MA was involved in ship-to-ship transfer operations for oil in mid-January 2018.

* Incorrectly classified as an entity, should be vessel. UK OFSI list does not have "vessel type"

What data looks like on Castellum.AI — 1104
Enrichment highlighted

FIG. 11

What data looks like on US BIS Unverified List — 1202

Name: Huaduan (Anhui) Machine Tool Manufacturer Co., Chaoyang Rd #888, Dongguan Development, Si Town, Anhui Province, Suzhou, China

* Name and address are stuffed in one row
* No type is assigned
* No separation for country and address.

What data looks like on Castellum.AI Enrichment highlighted — 1204

What data looks like on Australia DFAT List: Citizenship — 1302

Afghan    British
Afghan    United Kingdom of Great Britain
Afghanistan    United Kingdom of Great Britain and Northern Ireland Filipino
Philippines Iran
Iran; nationality Iran
Iranian Possibly Ethiopian China
Chinese

What data looks like on Castellum.AI Enrichment — 1304

Possibly Ethiopian ≫ ET
British
United Kingdom of Great Britain ≫ GB
United Kingdom of Great Britain and Northern Ireland Afghan
Afghani ≫ AF
Afghanistan Filipino
Philippines ≫ PH Iran
Iran; nationality Iran ≫ IR
Iranian China
Chinese ≫ CN

FIG. 13

What data looks like on French Sanctions List - Liste Unique de Gels

*Nom: Ocean Maritime Management Company, Limited - navire CHOL RYONG*

*Autres informations: N° OMI: 8606173 Navire appartenant à Ocean Maritime Management Company (OMM) Désigné par le Conseil de sécurité des Nations Unies le 02/03/2016, par le règlement (UE) 2017/1509 du 30/08/2017*

- Entry has both and entity and a vessel in the same cell
- Vessel IMO number not in ID format - not searchable or scannable

1402

What data looks like on Castellum.AI
Enrichment highlighted

What data looks like on UK OFSI Consolidated Sanctions List

*Citizenship: Afghan | Passport details: (1) OR801188 (Afghan), Issued on 28 Feb 2006, Expires 27 Feb 2011 under name Said Jan 'Abd al-Salam; (2) 4117921 (Pakistani), Issued on 9 Sept 2008, Expires 9 Sept 2013 under name Dilawar Khan Zain Khan (DOB 1 Jan 1972). NI Number: 281022505755 (Kuwaiti Civil ID no) under name Said Jan Abd al-Salam*

- Incorrectly written citizenship | ID information in text blob | ID issue and expiry information in blob | DOB in Blob

1502

What data looks like on Castellum.AI Enrichment highlighted

SYSTEM AND METHOD FOR PROCESSING DATA FOR ELECTRONIC SEARCHING

RELATED APPLICATIONS

This application claims priority to U.S. Provisional Application Ser. No. 63/064,239, filed on Aug. 11, 2020 entitled "SYSTEM AND METHOD FOR COMPLIANCE DATA ENRICHMENT AND THE ENGAGEMENT THEREO," the entirety of which is incorporated by reference herein.

FIELD

The embodiments herein generally relate to data watchlist screening tools and, more specifically, to data watchlist screening tools related to financial crime compliance databases.

BACKGROUND

Businesses globally are required to screen customers, vendors, transactions, and more against Financial Crime Compliance (FCC) watchlists. Although the data is publicly available, the location of these watchlists across thousands of different websites and the different formats in which they are stored (XML, JSON, PDF, HTML, etc.) makes it impossible in practice to check publicly available data for free. Moreover, even after a business purchases an expensive subscription from a legacy provider, typically over 99% of their results are false positive, primarily because of the poor data quality of the watchlist and screening methods that do not differentiate between data types or quality.

In view of the above, screening accurately is impossible. There is a need for systems to ingest unstructured watchlist data, enrich it, and screen it against enormous volumes of payment and customer information.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

Some embodiments provided herein relate to a system and method for labeling, categorizing, structuring, and enriching unstructured data. The system according to some embodiments, processes unstructured data, pull out all relevant items such as name, location, ID, ID type, citizenship and more and make the data fully searchable, with no human intervention. As FCC watchlist data can be related to terrorism or nuclear proliferation, we have no room for error, making this extremely difficult.

In one aspect, provided is a method for processing data for electronic searching, comprising: receiving raw data and calculating a checksum; comparing the calculated checksum to the current checksum; downloading the raw data to an object storage; parsing the raw data and transmitting the parsed data to a sanity check system; loading the sanity checked data to a staging database and performing a stability check process on the sanity checked data; and loading the stability checked data to a master database and transmitting the stability checked data to a data search platform.

In another aspect, provided is a system for labelling, categorizing, structuring, and enriching unstructured data, the system comprising: at least one database to receive raw data; a data enrichment system to enrich the received data; a sanity check system to perform a sanity check on the received data; a stability check system to receive the sanity checked data and perform a stability check; and a post check system to receive the stability checked data and perform a post check to generate a report and update a watchlist.

In another aspect, provided is a method for labelling, categorizing, structuring, and enriching unstructured data, comprising: receiving raw data and calculating a checksum; comparing the calculated checksum to the current checksum; downloading the raw data to an object storage; parsing the raw data and transmitting the parsed data to a sanity check system; loading the sanity checked data to a staging database and performing a stability check; loading the stability checked data to a master database and transmitting the stability checked data to a search platform; performing a plurality of post checks; and generating a report and updating a watchlist checksum and time stamp. Sanity checks are performed on a record by record basis i.e., they evaluate each list entry individually. Stability checks looks for anomalies in the data in aggregate e.g., are there all of a sudden much fewer entries in a list source than there were previously. Updating the checksum, for example, watchlist checksum, allows the system to detect when a list source has been updated by the data provider. We periodically check the checksum of the data hosted by the data provider and when that checksum differs from the one that was last updated in our database it triggers our system to process/ingest the new data.

In some embodiments, the method further comprises a method for model training comprising the steps of training a model on a subset of labeled data; applying the model to unlabeled data; electing a data sample for an oracle; classifying, via the oracle, the data; and consolidating existing labeled data and newly labeled data.

In some embodiments, the method further comprises a search engine to permit input of a plurality of search parameters to permit the user to search a watchlist for enriched data.

In some embodiments, the method further comprises a data acquisition process comprising the steps of uploading, via a user, a client list; screening names provided on the client list and displaying hits thereof; classifying, via the user, the hits and the match type; providing, via the user, a reason for a classification and a plurality of notes; and saving an audit record.

In another aspect, provided is a system for labelling, categorizing, structuring, and enriching unstructured data, the system comprising: at least one database to receive raw data; a data enrichment system to enrich the received data; a sanity check system to perform a sanity check on the received data; a stability check system to receive the sanity checked data and perform a stability check; and a post check system to receive the stability checked data and perform a post check to generate a report and update a watchlist.

In some embodiments, the system further comprises a search engine to permit input of a plurality of search parameters to permit the user to search a watchlist for enriched data.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 4 illustrates a flowchart of the data acquisition process, according to some embodiments;

FIG. 5 illustrates a flowchart of the model training process, according to some embodiments.

FIGS. 9-16 are illustrative screenshots of examples of a display of data enrichment profiles, according to some embodiments.

DETAILED DESCRIPTION

Figure 1:
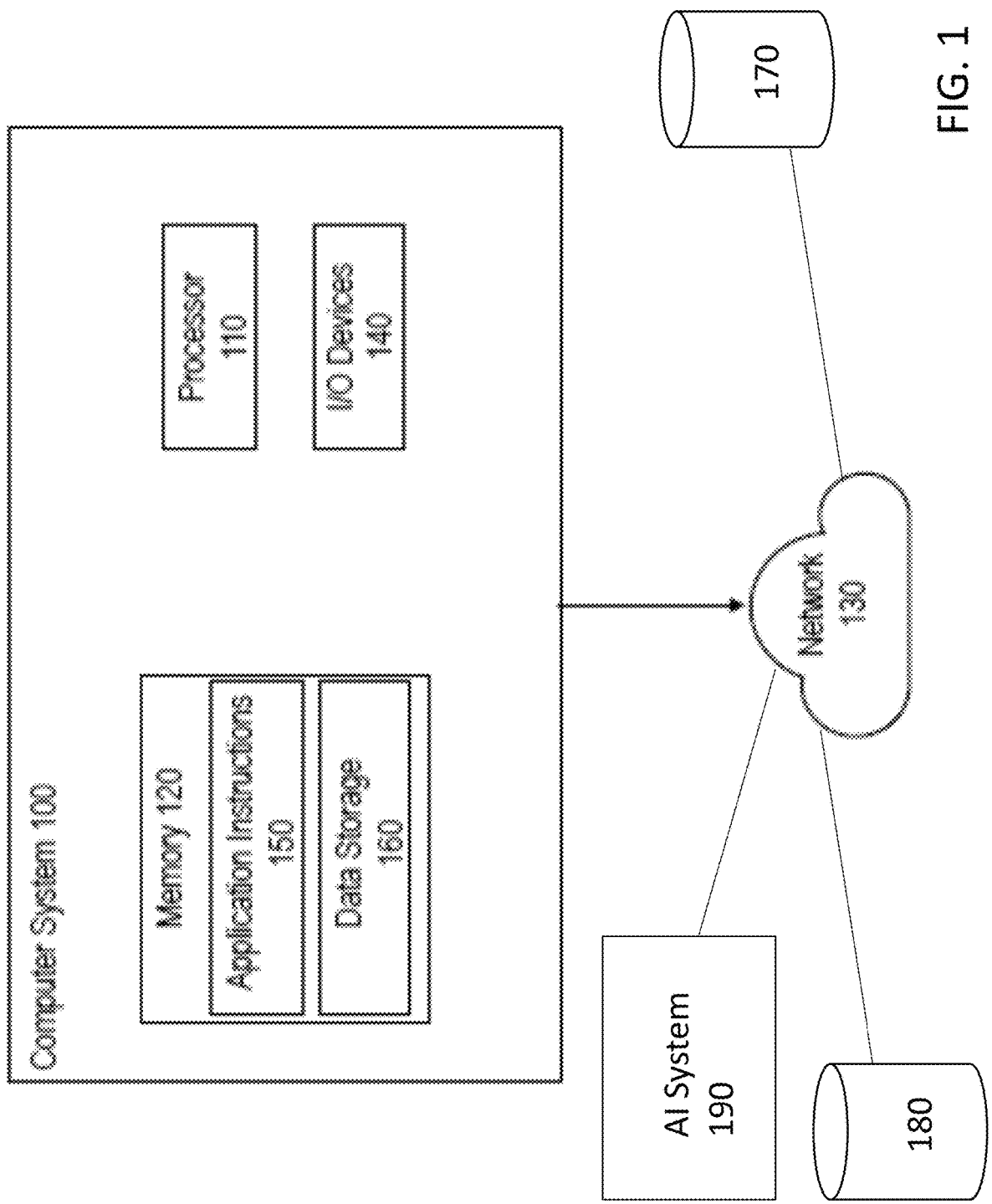
FIG. 1 illustrates a block diagram of the network infrastructure, according to some embodiments.

The specific details of the single embodiment or variety of embodiments described herein are to the described system and methods of use. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In brief overview, embodiments of the present inventive concept ingest raw, unstructured, textual data and normalize it into a proprietary canonical format, especially data sources having errors or missing data. In doing so, a system and method are provided for transforming unstructured watchlist data into structured, enriched data within a strict schematic that allows immediate and accurate screening without any human or manual intervention. In particular, errors or missing information are addressed automatically instead of conventional solutions which either make no attempt to address and resolve the errors or attempt to resolve the errors manually in a time consuming and expensive manner. The data processed by embodiments of the inventive system and method is structured and enriched in near-real time, for example, every 5 minutes, in any language, without a loss of accuracy. First, the system cleans all the data by removing problematic characters, standardizing all country and location related information to ISO standard codes, use named entity recognition to extract ID numbers and ID types from unstructured text fields, and apply sanity checks that ensure data integrity, for example: only individuals should have dates of birth and places of birth. Finally, the system assigns each item a type (individual, entity, vessel, aircraft, location), which is important in properly doing entity resolution.

Sanity checks are performed on a record by record basis, i.e., they evaluate each list entry individually. The system also performs stability checks, which searches for anomalies in the data in aggregate e.g., an immediate determination that there are fewer entries in a list source than previously determined.

A data schema is designed with rigid categories. These categories may include, but are not limited to, a watchlist entry type, a vessel, individual, entity or individual, type of watchlist, sanctions, export controls, law enforcement, and the like, gender, type of vessel, e.g., oil tanker, cargo, and so on, the language is the original entry, etc. When such items are absent from watchlist data, the system analyzes it, and through automated methods enrich it, by adding types, categories, dates of birth, place of birth, addresses IDs, ID types and more. Transforming unstructured watchlist data into enriched data within a strict schematic solves the abovementioned technical problem associated with conventional technologies, but offering an improvement by allowing systems to screen payments and databases (such as a bank's customers) against enriched compliance data, in bulk, in any language, without a loss of accuracy.

In some embodiments, the system includes an input engine that utilizes anonymized data generated by our users globally. In some embodiments, the process executed by the system guides users through a decision tree that labels data, by assigning it types, categories and more, as described herein. The system can apply a machine learning technique to the process to tackle the false positive rate plaguing this space. The inventive process guides users through the process of labeling their data. This includes assigning it a type (individual, entity, vessel, aircraft, location), categorizing matches as true positives, false positives, or need more information, and providing the reasons for the match result assessment as a true or false positive, etc. We then provide that product (improved search with fewer false positives), back to users, which enables users to better fight financial crime through automated insights regarding their data. Being able to automatically detect if what is being screened is a vessel or individual, (both can have names like Wei Sun, for example), leads to better and faster decisions. The system will benefit all persons and businesses who use machines to screen watchlist data as well by allowing for a comparison of like-data against like data, reducing time, labor and economic resources required. The system may be utilized as a financial crime prevention tool by businesses that are currently unable to use presently available tools due to their cost and complexity.

In some embodiments, the system may include a model training process, including the steps of training a model on a subset of labeled data and applying the model to unlabeled data. The system may then elect a data sample for an oracle or the like, which classifies the data. Newly labeled and existing data can then be consolidated.

In general, the embodiments provided herein relate to a system which processes machine learning technology to label, categorize, structure, and enrich unstructured data in the Federal Communications Commission (FCC) field. The invention is: transforming unstructured watchlist data into enriched data within a strict schematic that allows systems to screen payments and databases against enriched compliance data, in bulk, in any language, without a loss of accuracy. The system will benefit users, as well as businesses whose employees utilize the system, by reducing labor and economic resources required when managing data. One application of the system may be utilized as a financial crime prevention tool by businesses that are currently unable to use presently available tools due to their cost and complexity.

In some embodiments, the system receives unstructured data and pulls relevant information contained in the data, such as names, locations, identification information, citizenship, etc., and transforms the data into a fully searchable format without requiring significant human intervention. As an example, the U.S. Department of Commerce's Bureau of Industry and Security (BIS) has multiple watchlists related to individuals and entities banned from receiving sensitive items, such as carbon fiber, for reasons including nuclear proliferation, human rights abuse, and cooperation with the governments of North Korea and Iran. One such company is a Chinese manufacturer named "HiSilicon". On the BIS watchlist, the entry for HiSilicon shows the name as: "HiSilicon Technologies Co., Ltd (HiSilicon), Bantian Longgang District". The entry combines the company name, an alias and address all into one. Without extracting key parts from this text, like name, alias and address, users of the government website, as well as of other services, would either get no match at all, or get so many false positives that they would likely also not see it. The result would be that sensitive items would be exported to a malicious company, a violation of U.S. law, likely fines and more. In a public statement regarding a $1.4 million fine from Jul. 23, 2021 the U.S. Treasury stated that a company's "Apparent Violations, which related to commercial transactions processed by Payoneer on behalf of its corporate customers and card-issuing financial institutions, resulted from multiple sanctions compliance control breakdowns, including (i) weak algorithms that allowed close matches to SDN List entries not to be flagged by its filter." https://home.treasury.gov/system/files/126/20210723_payoneer_inc.pdf, incorporated by reference in its entirety. Embodiments of the inventive concept negate this risk. In the example used above, instead of trying to match user information against "HiSilicon Technologies Co., Ltd (HiSilicon), Bantian Longgang District", the system and method in accordance with some embodiments show that the company has two aliases, "HiSilicon Technologies Co., Ltd" and "HiSilicon" and addresses of "Shenzhen, 518129, China" and "Bantian Longgang District, China". Continuous, high quality and automated data enrichment and structuring thus has a direct effect on helping users comply with local law.

In some embodiments, data is received and normalized into a canonical format. First, the data is cleaned to remove problematic characters, standardizing location and country-related information to ISO standard codes. Named entity recognition is used to extract identification numbers and identification types from unstructured text fields. The system applies sanity checks that ensure data integrity; for example, only individuals should have dates of birth and places of birth. Finally, the system assigns each item a type (e.g., individual, entity, vessel, aircraft, location), which is utilized in properly performing entity resolution.

The next step involves allowing users on a cloud-based platform to label and categorize FCC data on a global scale. This enables the system to apply machine learning techniques to manage the 99% false positive rate otherwise plaguing the industry. The workflow guides users through the process of labeling their data. This includes assigning the data a type (e.g., individual, entity, vessel, aircraft, location), categorizing matches as true positives, false positives, or as needing more information, and providing the reasons for the categorization. The system then provides the product back to users, enabling them to better combat financial crime.

The system manages unstructured information that belongs to an individual, entity, vessel, aircraft, or location that may or may not match an individual, entity, etc. found on a government watchlist. To achieve the ultimate goal of automating the FCC screening process, a classifier is developed to correctly classify each of such components of data as belonging on a watchlist or not.

With an active learning methodology, the system trains a model in an iterative fashion, achieving greater levels of accuracy with a more limited training data set. The system methodologies will consist of a set of labeled data, a set of unlabeled data, models, an active learning strategy, and an oracle. The data may be comprised of multi-word phrases to permit the model to consist of a character-level encoder and a word-level encoder, which can be implemented as a CNN or LSTM RNN, and which will be fed to a classification step. Within the first iteration, the model will be trained using the labeled data set.

Figure 8:
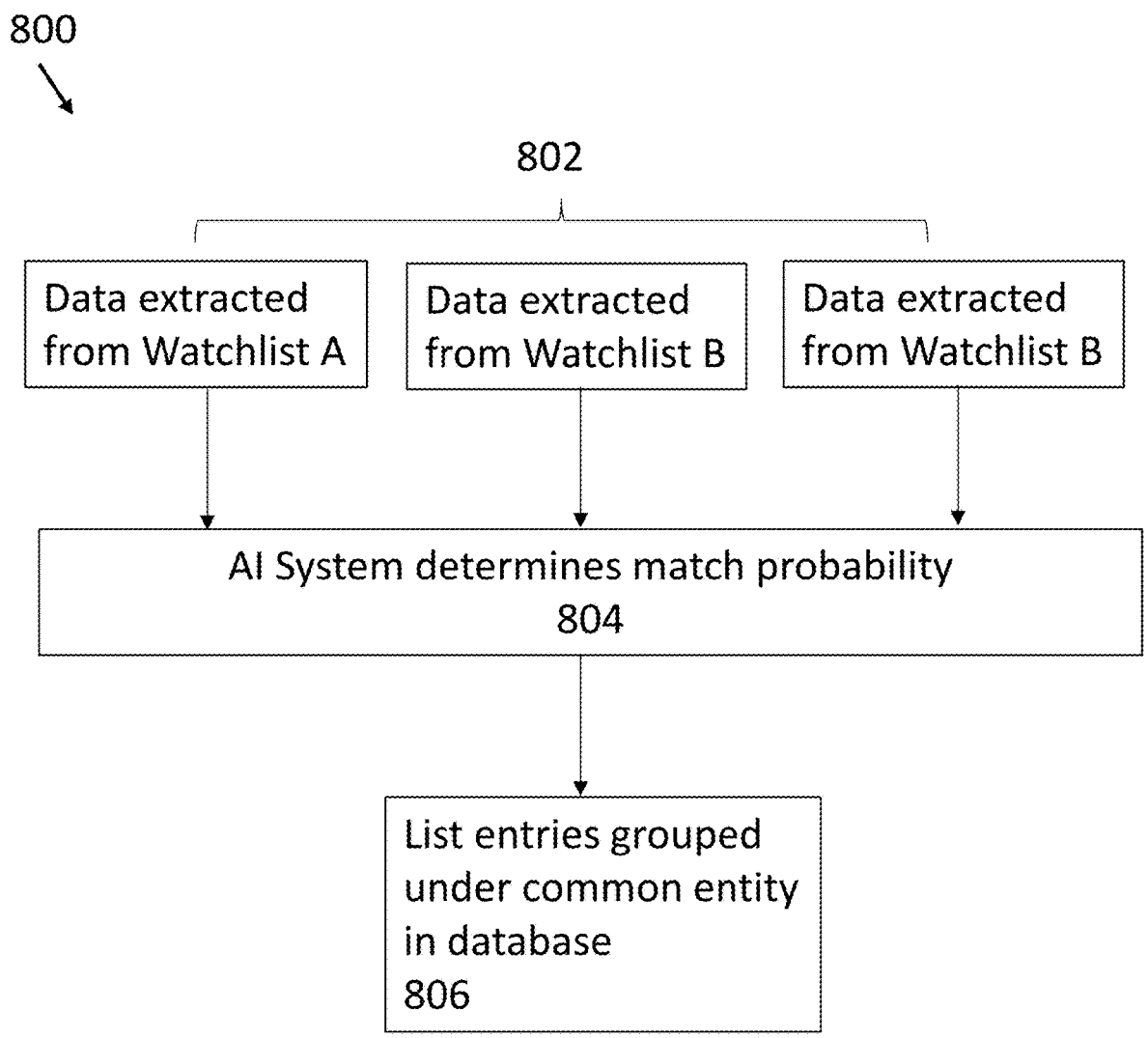
FIG. 8 illustrates a flowchart of an operation performed by the Artificial Intelligence (AI) system of FIG. 1.

Upon subsequent iterations, the model will be applied to the unlabeled data set, providing classifications along with a confidence metric. Using an uncertainty-based sampling strategy, a subset of the unlabeled samples will be elected for classification by the oracle. The oracle will label the elected samples, and the model will be retrained using the original labeled data in addition to the newly labeled data. At the onset, the oracle will be comprised of primary users who will be responsible for labeling the new samples. Eventually, this aspect may be crowdsourced by leveraging the data provided by users of our workflow solution whereby they classify, categorize, and validate potential hits flagged by our system and consequently generate the very labeled data necessary to train a model. This iterative process will be repeated until a convergence in model performance is reached. The foregoing is illustrated in FIG. 8, which illustrates a workflow that includes the receipt of inputs from various users.

After developing the preliminary version of the classifier, which the system will provide to users, the system will be capable of further refining its performance. As part of the FCC process, users of the system will be required to validate the output of the model, which the system can leverage as out-of-sample testing.

The primary objective of the data ingestion process is to consume unstructured watchlist data, enhance the data, and transform the data into system's internal, highly structured, canonical format with monitoring and alerts to ensure data integrity. The lack of structure in the source data requires that the present system be able to extract all pertinent information, oftentimes, from raw bodies of text.

The source data must be mapped to the system's internal representation and at system's required level of granularity. For example, names must be broken down into first name, last name, middle name, etc. Similarly, addresses must be broken down into street address, city, area code, etc.

In some embodiments, certain fields, which are categorical in nature, are standardized even though watchlist data from different issuers may be received by the system in different formats. For example, this standardization applies to country information, including citizenship, address, country, place of birth etc. The system also standardizes identification types, e.g., passport, driver's license, etc. Different languages and standards across countries are accounted for. Further, the system standardizes common descriptive data such as title, position, height, eye color, and the like.

In some embodiments, data is enriched by analyzing an entry's data and enhancing it by then adding, or enriching the data with information, for example, described by way of example here. For example, many lists do not specify whether the entry is an entity, individual, vessel, aircraft or location, all of which are different types of entries. Upon placement in the system's database, all entries are assigned one of these types, which is a key data category that helps determine how entries are searched and screened and a major driver in false positive reduction.

In some embodiments, provided is a search algorithm constructed and arranged as a proprietary matching and scoring algorithm stored and executed by the system. It is designed to provide high scores for relevant results without creating a flood of false positives. While there is usually a trade-off between accuracy and flexibility we maximize both by taking a novel approach to search. Unlike conventional solutions, embodiments of the system and method incorporate the algorithm to analyze textual data on a granular level. Text is not processed as merely words, but as smaller one, two, or three character tokens and their relationships. The end result is a tool that is not susceptible to differences in spelling or word order, works across languages, and reduces false positive rates. For example, the improved matching capabilities for names and addresses are provided using the matching and scoring algorithm, which can be built on top of configurable n-gram algorithms included with a database of interest. This also solves for concatenation or gluing (e.g., when spaces are removed), changes in punctuation, and reversal of search terms (e.g., when n the text order is reversed or otherwise different than the list data).

Users can customize which watchlists and what type of data they want to be screened from multiple different categories, including sanctions, export control, law enforcement, and contract debarment. Due to our invention's data structure, users can construct screens for example: only individuals with Malaysian citizenship located in Russia that are on law enforcement most wanted lists, or vessels on sanctions lists, or entities on export control and sanctions lists located in Mexico. This flexibility provides for better results and better due diligence, and is a significant improvement over just screening a name and getting 99% irrelevant results. This flexibility is only possible due to our data structure and data enrichment.

The watchlists, for example, a watchlist checksum, are rapidly updated, such as 5 minutes after an update, through a process that involves automated data normalization, enrichment, and quality assurance. For example, characters such as á, é, í, ó, ú, ü, ñ are normalized and turned into a, e, i, o, u, u, n respectively, eliminating special characters as a cause for errors. In many existing systems, the presence of special characters significantly hampers the search and matching algorithm, resulting in missed matches or false positives. Anytime a watchlist has an entry that does not have a type, the system assigns it a type. For example, on the U.S. BIS export control list, names are not assigned types. Therefore, a search for a specific name will not immediately show that the result is an individual or entity. The system algorithms assign it as an entity based upon entry information. The system may also improve and correct data. For example, a name on the United Kingdom watchlist may also be a vessel, but it is assigned type "entity." The system assigns it as type "vessel" based on multiple factors, including the presence of vessel identification numbers in the entry. Data is also automatically checked for quality; for example, a vessel should not have a place of birth, and an individual should not have a tail number as an identification. Such errors are readily present in source data. Unlike conventional system, embodiments of the present inventive concepts incorporate algorithms that automatically flag and resolve these issues.

By assigning a type to all entries (e.g., individual, entity, vessel, aircraft, location), the system can enable a smart comparison and only match individuals with individuals, vessels with vessels, aircraft with aircraft, etc. Other vendors that do not assign types are unable to perform this operation, resulting in an increase in the number of false positives.

The system implements a flexible search algorithm, which utilizes a modification of n-gram matching systems. An n-gram is well-known for including a contiguous sequence of "n" items from a given sample of characters, and can include words, syllables, sounds, or numbers. While other systems in the arts may use one algorithm for sound "soundex" and others for comparing whole text "Levenshtein", the algorithm used by the system disclosed herein examines all facets of a match. Typically, n-gram is used for features such as autocomplete, but the system uses it to compute a similarity score. The system splits text into 1 and 2 character tokens and takes the ratio of tokens that match to calculate a similarity score. Before this happens, the system normalizes text to ensure that items such as capitalization or accented characters do not affect the similarity score. Further, unlike software providers in the current arts, the embodiments provided herein can show good results for attached words (e.g., Empirestate vs Empire State), punctuation (e.g., Empire, State vs Empire State) and word reversals (e.g., State Empire vs Empire State).

In summary, embodiments of the systems and methods for data enrichment for purposes of electronic searching offers several improvements. Faster data access and availability, for example, 5 minutes or less, through automatic ingestion processes as compared to many weeks provided by conventional systems. The systems and methods can detect significant data changes or errors from the data source. New fields in source data can be immediately made available to the user without human intervention by leveraging dynamic mapping capabilities of the database. The systems and methods provide improved matching capabilities for particular data types such as names and addresses, while addressing gluing or concatenation challenges, punctuation, reversal of search terms, and in doing so reducing the number of false positives as compared to conventional systems.

FIG. 1 illustrates a computer system 100, which may be utilized to execute the processes described herein. The computer system 100 is comprised of one or more standalone computers or mobile computing devices, mainframe computer systems, workstations, network computers, desktop computers, laptops, or the like. The computer system 100 includes one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface. The display of the computer system 100 can display user information, for example, shown by way of example in FIGS. 10-17 herein.

Processors 110 suitable for the execution of a computer program include both general and special purpose microprocessors and any one or more processors of any digital computing device. The processor 110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, and/or a portable storage device (e.g., a universal serial bus (USB) flash drive), but not limited thereto.

A network interface may be configured to allow data to be exchanged between the computer system 100 and other computer-based devices 170, 180, 190 attached to a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a data storage 160 comprising various data accessible by the application instructions 150. In some embodiments, a database 170 is standalone with respect to the computer system 100, for example, a physically separate device connected to the network 130 and configured to communicate with the computer system 100 via the network 130. The database 170 can store most recent processed and enriched watchlist data indexed for searching. Database 180 can store relational data such as historical processed watchlist data, any categorical data defined by our system, and other reference data e.g. ISO 3166 country information. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, Go, Python, etc.). In some embodiments, a third party database 180 and Artificial Intelligence (AI) system 190 performing machine learning (ML) operations may communicate with the computer system 100 via the network 130, for example, including raw data.

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine- readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device. Data categories may include the following: name, alias, weak alias, date-of-birth, place-of- birth, list source, list, type, address (e.g., street, local, regional, country, etc.), identification type, identification number, identification issue date, identification expirations date, and additional information. One skilled in the arts will readily understand that additional data categories may be utilized.

Searchable categories may include the following: name, alias, list source, address (e.g., street, local, regional, and country), identification number, and type; however, additional searchable categories such as each listed data category hereinabove may be included.

Figure 2:
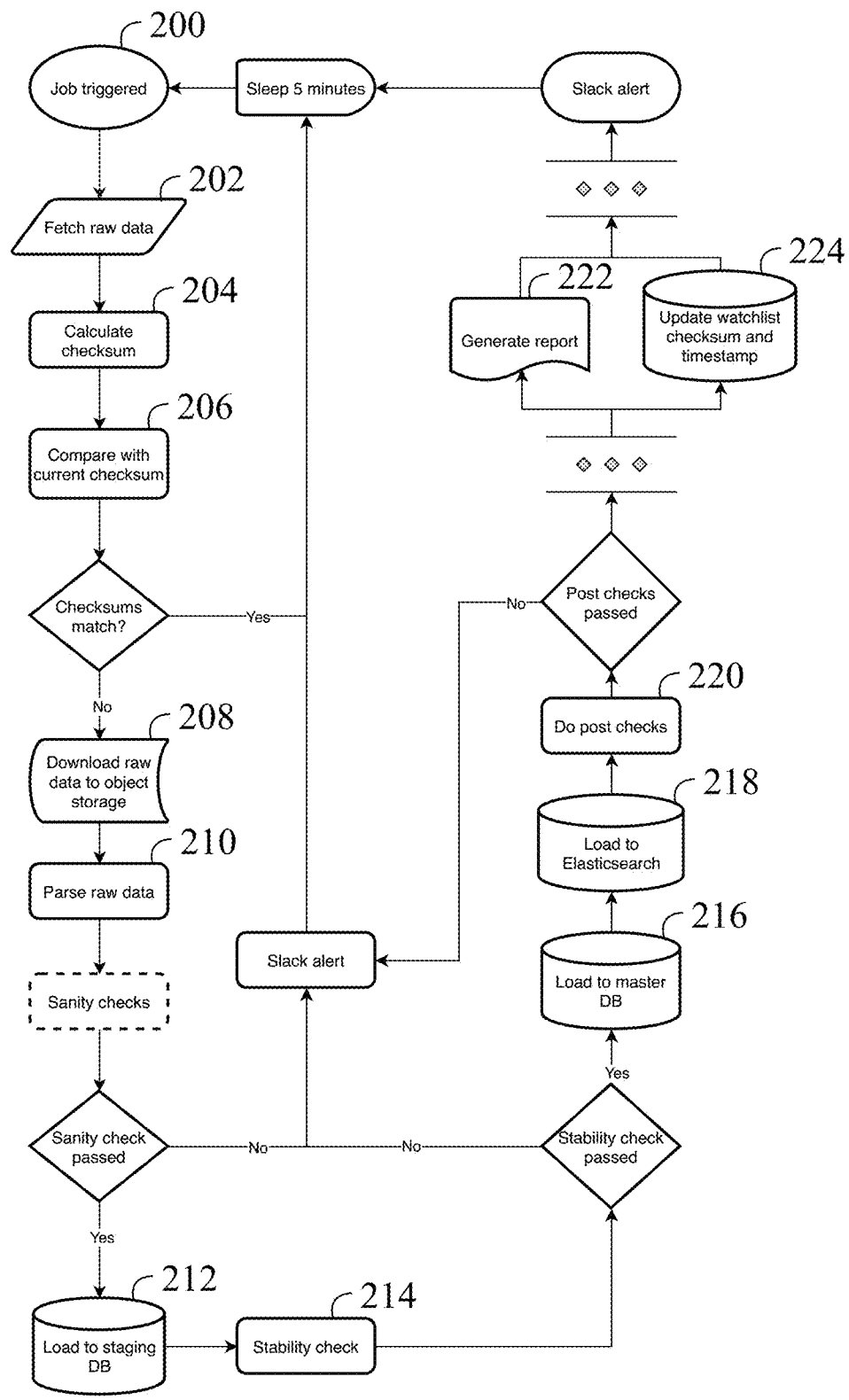
FIG. 2 illustrates a flowchart of the data intake, sanity check, and post check processes, according to some embodiments.

FIG. 2 illustrates a flowchart of the process utilized by the system described herein. In step 200, a job is triggered, and the system receives raw data in step 202. In steps 204 and 206, the system calculates a checksum and compares with the current checksum. If the checksum matches, the system waits for a period of time (e.g., 5 minutes) and returns to step 200 to repeat the process. If the checksum does not match, the system proceeds to step 208 wherein raw data is downloaded to the object storage. In step 210, the data is parsed and transmitted to the sanity check process illustrated in FIG. 3. If the sanity check is passed, the data is loaded into the staging database in step 212. In step 214, a stability check is performed once the data is loaded into the staging database or if the sanity check is not passed. In step 216, the data is loaded into the master database, and in step 218, the data is loaded into the search platform to perform post checks in step 220. If the data does not pass post checks, the system waits for a period of time (e.g., 5 minutes) and returns to step 200. If the data passes the post checks, a report is generated in step 222 and the watchlist is updated in step 224.

Figure 2A:
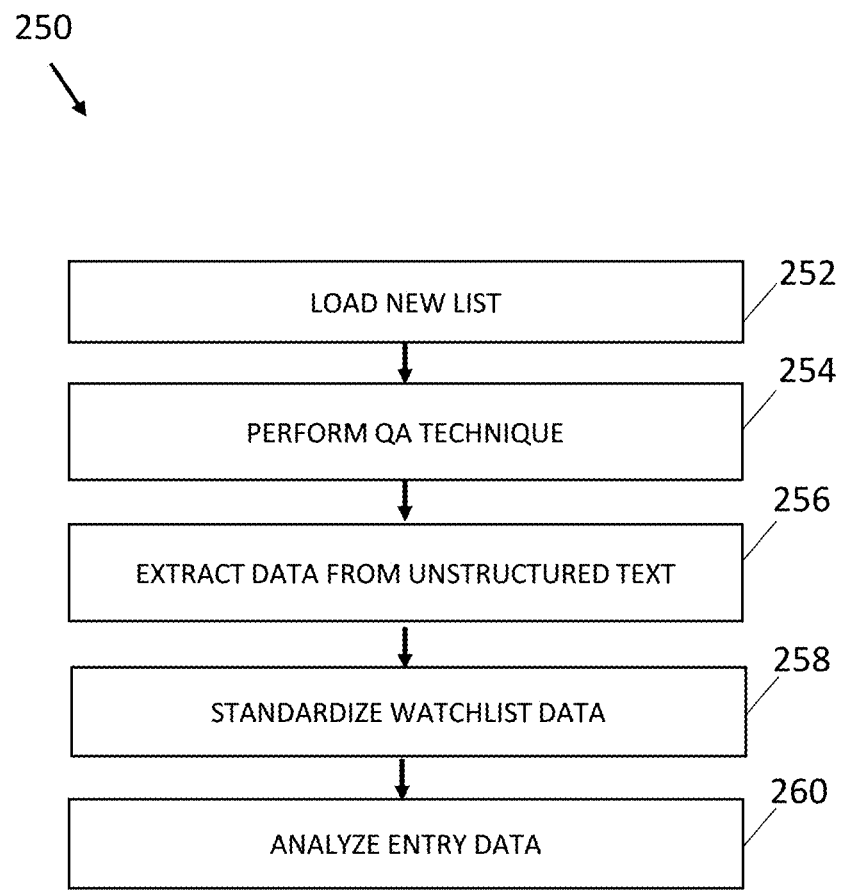
FIG. 2A illustrates a flowchart of a method for processing data for electronic searching, according to some embodiments.

FIG. 2A illustrates a flowchart of a method 250 for processing data for electronic searching, according to some embodiments. As described herein, it is imperative that a clean data model is provided to correct data errors. In step 252, a new list is loaded. In some embodiments, the list is derived from unstructured watchlist data or the like. In step 254, a quality assurance technique is performed.

In step 256, valuable data is extracted from the unstructured text. Some list sources may use a category to extract the data. Others may use a row of the stored data, such as "name" or "additional information" to insert data such as place of birth, date of birth, ID numbers, and so on. The method 250 includes an algorithm that identifies and extracts particular data such as passport numbers, citizen information, vessel identification (IMO), and the like to categorize the data for electronic searching purposes. For example, the United Kingdom (UK) sanctions list includes vessels and has their vessel ID numbers, but the UK government actually incorrectly calls the vessels "entities" and lumps their IDs into and free text field where the information is defacto inaccessible. Our invention automatically extracts this valuable data, and uses the presence of a vessel ID to change the type from "entity" to vessel. A specific example is the vessel "Paek Ma" on the UK sanctions list. It's entry looks like this "Name: Paek Ma | Type: Entity | Other information: (IMO number: 9066978). Annex XIV. [UN Listing (formerly temporary listing, in accordance with the Policing and Crime Act 2017]. DPRK vessel M/V PAEK MA was involved in ship-to-ship transfer operations for oil in mid-January 2018." We extract the vessel ID (9066978, recategorize Paek Ma as a vessel), and do this automatically.

In step 258, watchlist data from different issuers (see FIG. 8), can be provided in different file formats, such as CSV, PDF, XML, JSON, images, and so on. Each list issuer may have different standards and formats. For example, some organizations may refer to a person's passport by citizenship, while others refer to the passport by nationality. Different spellings and abbreviations exist for the same countries, while dates are ordered differently. Accurate data standardization includes matching algorithms and additional data sources and standards to eliminate irrelevant "noise" words and the like to convert the country information to a particular standard, for example, the ISO 3166 standard.

Data standardization may include the automated processes of taking unstructured data from raw data sources (websites, pdfs, press releases, paragraphs within structured data) and conforming it to a data structure stored in the system. This takes data that is otherwise hard to find and makes it searchable in the system. Additionally, incorrectly categorized information from the source is remapped to correct fields in the data of interest.

In some embodiments, the system may perform date normalization functions, for example, used for date-of-birth (DOB) and ID issue/expiration dates, conforms dates from multiple formats in multiple languages to a common format to allow for searching. In some embodiments, the system may perform country normalization functions, such as parsing a computer processing engine for receiving and processing country names, abbreviations, former names, "dirty" country data, in multiple languages and formats to conform them to ISO standard names to allow for searching.

In step 260, an entry data is analyzed, and enhanced, or enriched, with additional information by creating data or filling in gaps from existing source data. For example, a set of algorithms are executed to assign it a type, such as the addition of ID Type (passport, IMO, etc), Entity Type (Individual, Vessel, Entity, etc) where there is none in the source data. This is a key data category that helps determine how entries are searched and screened, and a major driver in false positive reduction. In other examples, enrichment may including taking publicly available non-risk data (PEPs data specifically) and classifying individuals according to thematic risk categories useful to compliance users. For example, grouping of politicians based on their place of birth, citizenship, or country for the office they hold. Another example may pertain to the modeling of relationship data. For example, someone with multiple degrees of separation from a high profile politician can be searched in system and it will show the connection to the elevated risk individual.

Figure 3:
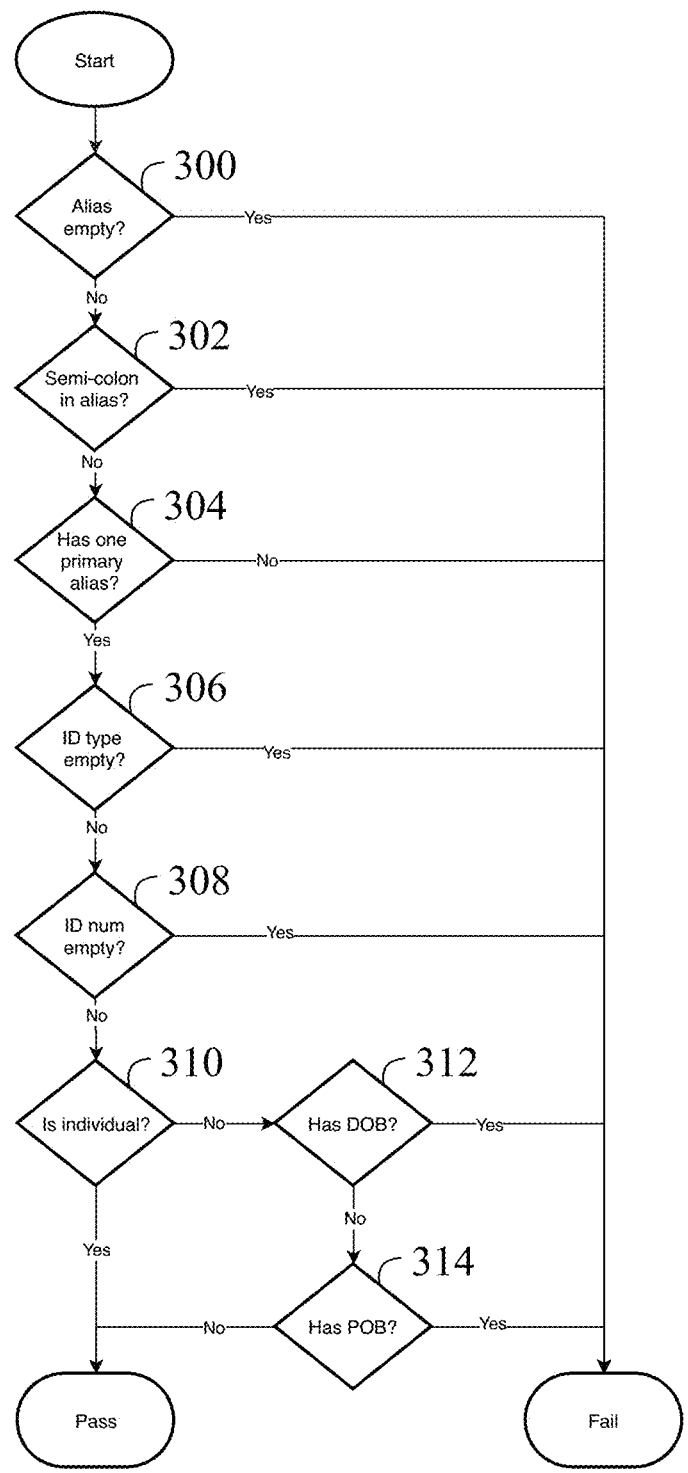
FIG. 3 illustrates a flowchart of the sanity check process, according to some embodiments.

FIG. 3 illustrates a flowchart of the sanity check process wherein the steps comprise determining if an alias is empty 300, if a semi-colon is in the alias 302, if there is a primary alias 304, if the identification type is empty 306, if the identification number is empty 308, if the information relates to an individual 310, if the individual's information includes a date-of-birth 312, and if the individual's information includes a place-of-birth 314. A fail will result if the alias is empty, if there is a semi-colon in the alias, if the identification type is empty, if the identification number is empty, and if the information does not relate to an individual but does include a date-of birth and/or place of birth. A pass will result if the alias is not empty, if there is no semi-colon in the alias, if there is a single primary alias, if the identification type and number is not empty, and if the information relates to an individual.

FIG. 4 illustrates a flowchart of the data acquisition process. In step 400, the user uploads a client list and screens the list for the names of the clients in step 402. In step 404, the system displays the hits, and the user classifies the hits in step 406. In step 408, the user classifies the match type. In step 410, the user provides a classification reason, as well as notes in step 412. In step 414 the audit record is saved to the database.

FIG. 5 illustrates a flowchart of the model training process 500 which is used in a machine learning process to label, categorize, structure, and enrich unstructured data. Some or all of the process 500 can be performed in elements of the network diagram shown and described in FIG. 1. The model is trained on subset of labeled data and applied to model unlabeled data. The system will elect a data sample, which is transmitted to the oracle, which classifies the data. Existing labelled data and newly labeled data is then consolidated used for further training of the model.

Figure 6:
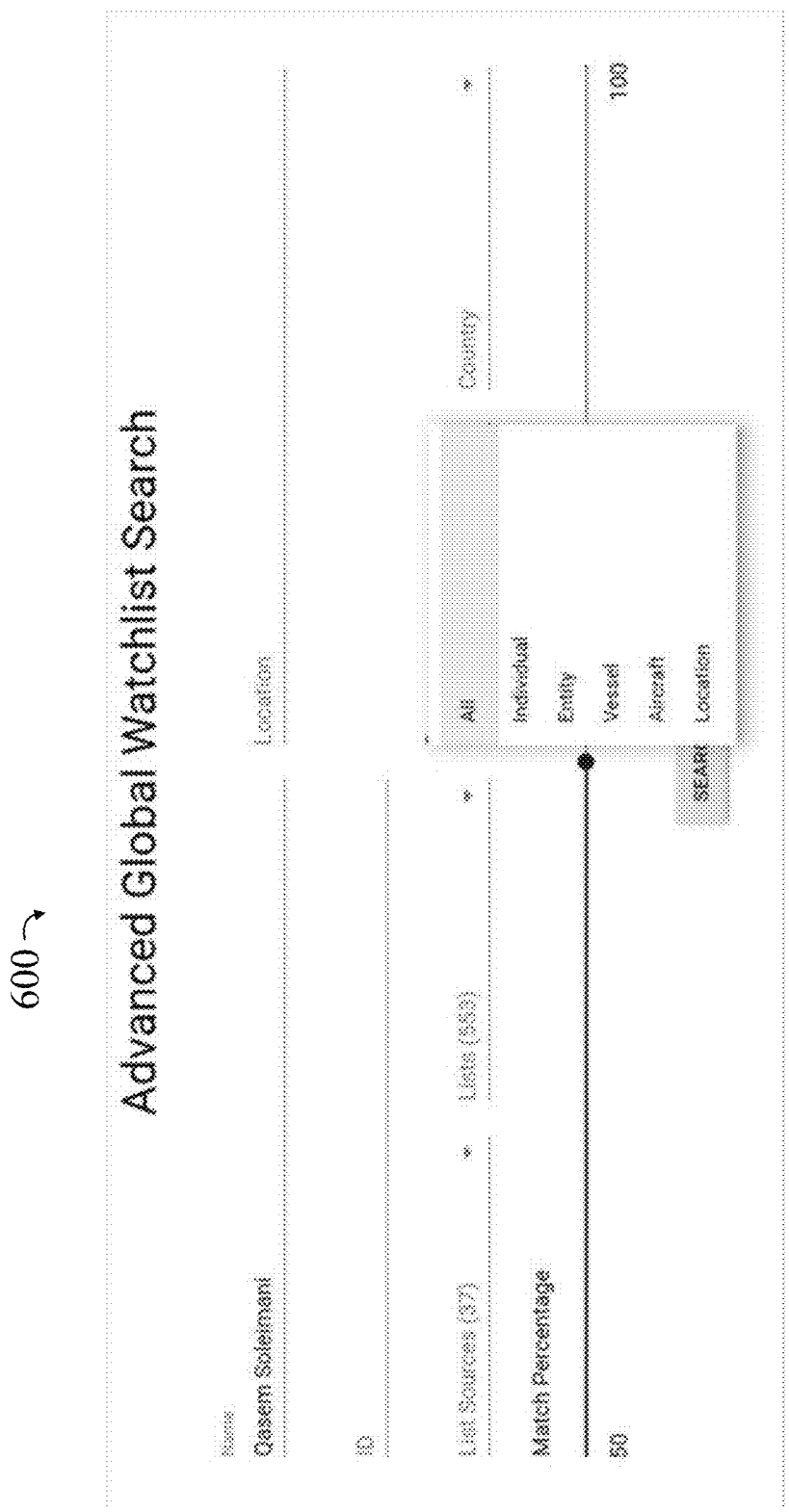
FIG. 6 illustrates a screenshot of the advanced global watchlist search interface, according to some embodiments.

FIG. 6 illustrates a screenshot of the global watchlist search interface 600 wherein the user can input search parameters (e.g., name, location, identification number, etc.). The user may be provided with a "type" drop menu, which allows the user to indicate the type (e.g., individual, entity, vessel, aircraft, and location). The user may also indicate a match percentage for results which then are displayed, allowing the system to only provide results meeting predetermined levels of matching. In the illustrated example, the user is searching by entering a name. However, the user may also search utilizing other information, such as by inputting a location, identification number, country, or other search parameter.

Figure 7:
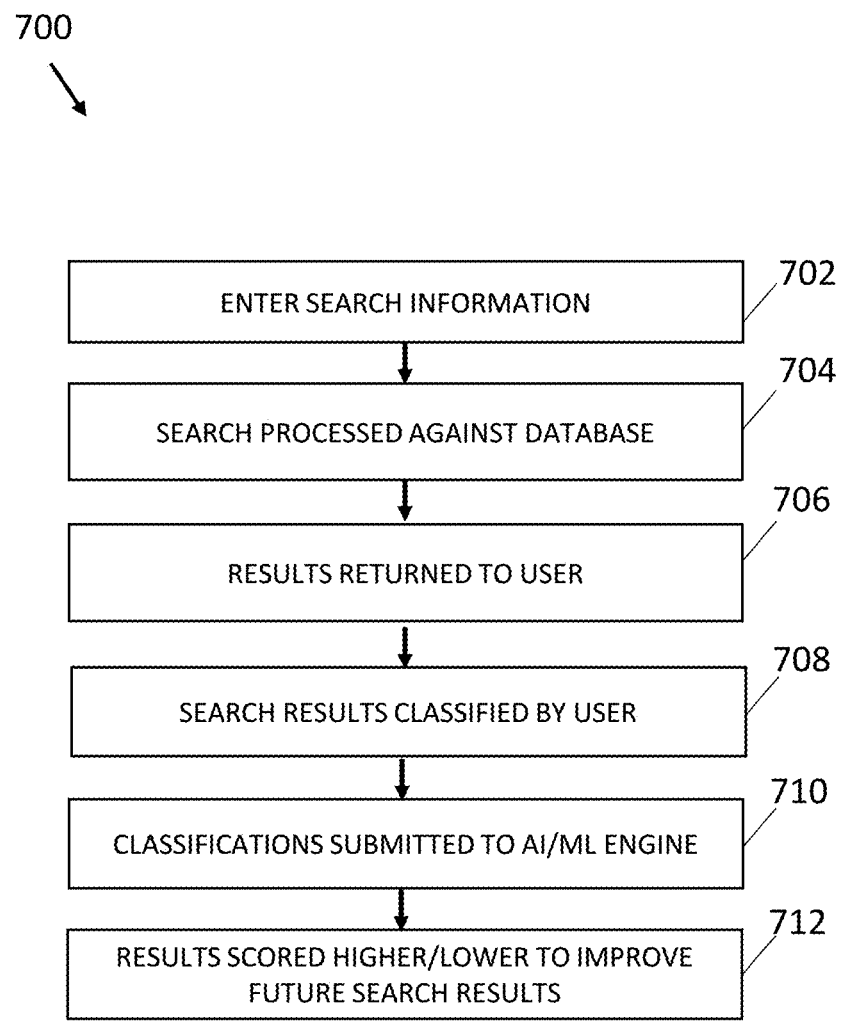
FIG. 7 illustrates a flowchart of a method for reducing false positive results by performing a crowdsourced labeling operation of data, according to some embodiments.

FIG. 7 illustrates a flowchart of a method 700 for reducing false positive results by performing a crowdsourced labeling operation of data. Some or all of the method 700 may be performed by elements of the network diagram illustrated and described with reference to FIG. 1, for example, the AI system 190. The method 700 may include a model training process 500 of FIG. 5.

An example of reducing false positives according to some embodiments includes a user searching a database for a name and receiving twenty (20) results or "hits", five (5) of which are classified by the user as false positive results, yielding a 25% false positive rate. The classification data is fed back into the system to train the machine learning engine and reduce future false positive positives. A subsequent user may perform the same search but receive fewer false positive results, for example, fifteen (15) hits, yielding a 0% false positive rate.

Accordingly, the steps of method 700 comprise the user entering search information 702, the search is processed against the database 704, returning the results to the user 706, classifying the search results by the user 708, submitting the classifications to the AI engine 190 710, and scoring the results (higher, lower) to improve future results 712.

FIG. 8 illustrates a flowchart 800 of an operation performed by the Artificial Intelligence (AI) system of FIG. 1. The process of determining whether Person A on list 1 is the same as Person B on list 2. In particular, data is extracted from each watchlist 802. The AI system 190 determines a match probability 804, and the list entries are grouped under a common entity in the database 806, for example, for performing an elastic search. The process 800 results in better filtering of search results and the reduction of false positives by allowing a user to view data at the entity level rather than an individual list entry.

FIGS. 9-16 illustrate examples of data extraction, standardization, translation, and enrichment as a result of automation instead of conventional manual quality assurance approaches. The system 100 herein can modify and enrich thousands of entries per list and make up to
ten (10) or more fixes per entry, fully automated. Various inputs 902-1602 may be entered electronically into the computer system 100 and/or other computer-based devices 170, 180, 190 attached to a network 130, and output as searchable data 904-1604, respectively.

Figure 9:
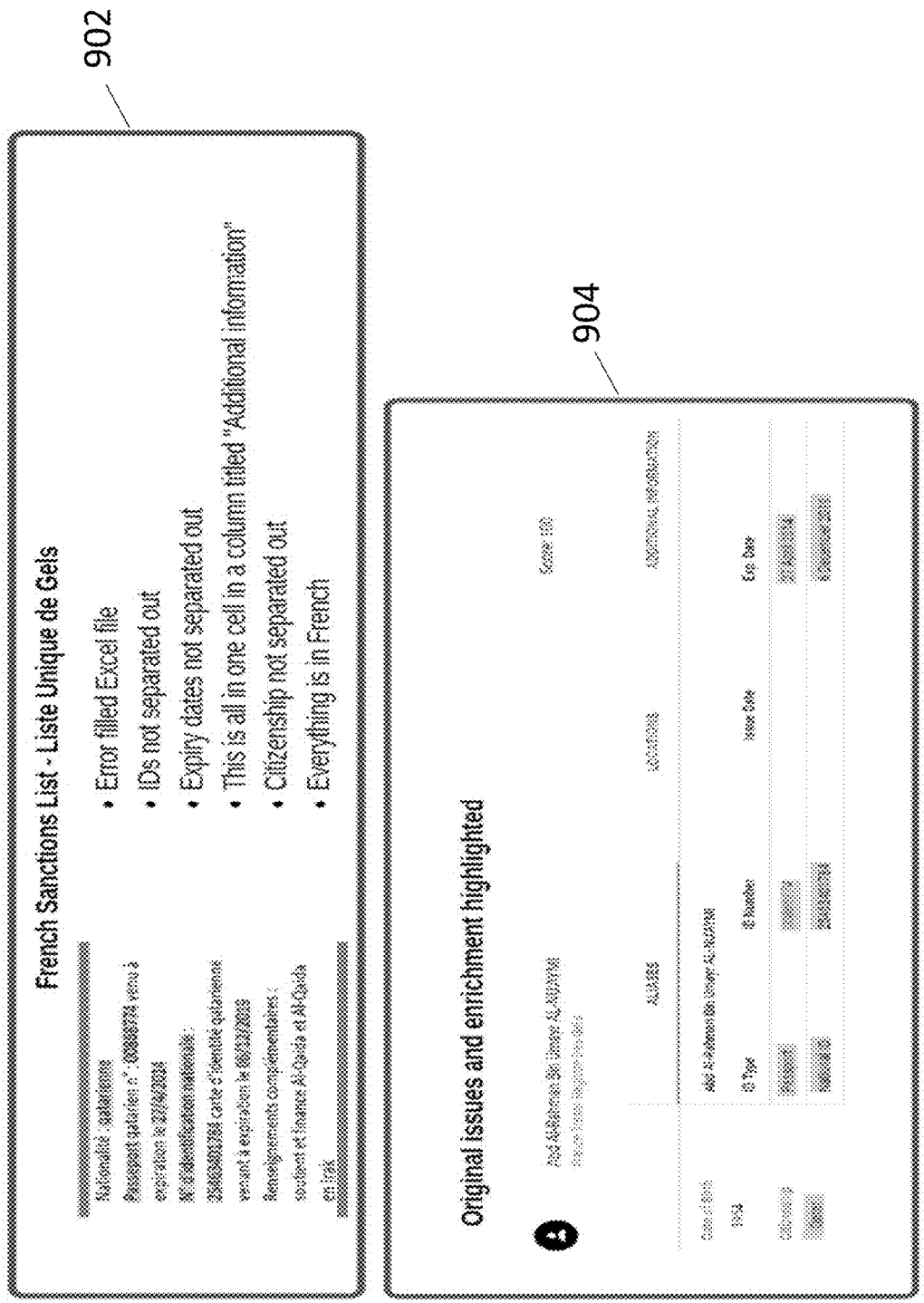

In FIG. 9, the data arrangement on a French Sanctions list 902 is shown. The data is processed according to one or more methods in accordance with embodiments herein, and in doing so, is arranged as shown in the display 904 in contrast to the list 902. Here, the key items such as citizenship, ID, and expiration date are identified, and the relevant data is extracted and processed to be searchable in a data repository, for example, a database, from where the type, e.g., passport, National ID, etc. is extracted and categorized. The relevant data is translated into English. In some embodiments, non-English searches can be performed. For example, searches can be performed in Arabic, Farsi, Chinese, and so on, and if a watchlist has a non-English term such as a name, the result can be displayed in the watchlist profile and can be searchable.

In FIG. 10, the data arrangement on a United Nations List Source 1002 is shown. The data is processed according to one or more methods in accordance with embodiments herein, and in doing so, is arranged as shown in the display 1004 in contrast to the list 1002. Here, the system determines that there is no identified non-ID information in the ID field. The relevant data is extracted and processed to be searchable in a data repository. The type, e.g., passport, National ID, etc. is extracted and categorized as shown.

In FIG. 11, the data arrangement on a UK OFSI Consolidated Sections list 1102 is shown. The data is processed according to one or more methods in accordance with embodiments herein, and in doing so, is arranged as shown in the display 1104 in contrast to the list 1102. Here, the system assigns the correct type, i.e., Vessel. The relevant data such as the ID is extracted and processed to be searchable in a data repository. A correct ID type is assigned, in this example, an IMO number, for example, after the system executes a process according to embodiments herein.

Figure 12:

In FIG. 12, the data arrangement on a U.S. BIS Unverified List 1202 is shown. The data is processed according to one or more methods in accordance with embodiments herein, and in doing so, is arranged as shown in the display 1204 in contrast to the list 1202. Here, the system assigns the correct type, i.e., Entity. The address is separated from the same, allowing for an accurate name scan and therefore reducing false positive results. The address and country are categorized to be searchable in a data repository.

In FIG. 13, the data arrangement on a Australia DFAT 1302 is shown. The data is processed according to one or more methods in accordance with embodiments herein, and in doing so, is arranged as shown in the display 1304 in contrast to the list 1302. Here, the data is standardized by the system, converted into a ISO 3166 format or other standards-based format, and configured to be searchable in a data repository.

In FIG. 14, the data arrangement on a French Sanctions List 1402 is shown. The data is processed according to one or more methods in accordance with embodiments herein, and in doing so, is arranged as shown in the display 1404 in contrast to the list 1402. Here, the system assigns the correct type, i.e., Vessel. The ID type is extracted and categorized as an IMO to be searchable in a data repository. The aliases are separated from the name and placed in a separate category, for example, a separate database record field for further searchability.

In FIG. 15, the data arrangement on a OFSI Consolidated Sections List 1502 is shown. The data is processed according to one or more methods in accordance with embodiments herein, and in doing so, is arranged as shown in the display 1504 in contrast to the list 1502. Here, the system corrects the citizenship from Afghanistan to Afghan for allowing the corrected citizenship to be searchable in a data repository. The IDs are separated and made searchable. Different ID types are assigned. Issue and expiry dates are added.

Figure 16:

In FIG. 16, the data arrangement on a Japan METI End User List 1602 is shown. The data is processed according to one or more methods in accordance with embodiments herein, and in doing so, is arranged as shown in the display 1604 in contrast to the list 1602. Here, the system assigns the correct type, i.e., Entity. The aliases are separated, including Japanese language. A list is assigned with a reason for designation, for example, M="Missile" to be made searchable.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the claims.

What is claimed is:

1. A method for processing data for electronic searching, comprising:
    receiving raw data and calculating a checksum, wherein the raw data includes unstructured watchlist data, and wherein the checksum is a watchlist checksum of the unstructured watchlist data;
    comparing the watchlist checksum to a previously calculated watchlist checksum to determine whether a change occurred in the raw data;
    downloading the raw data to an object storage;
    parsing the raw data to have a parsed raw data and transmitting the parsed raw data to a sanity check system;
    enriching the raw data with a combination of rigid data schema categories;
    loading the parsed raw data that is sanity checked by the sanity check system and enriched to a staging database and performing a stability check process on the parsed raw data that is sanity checked by the sanity check system; and
    loading the parsed raw data that is stability checked by the stability check process to a master database and transmitting the parsed raw data stability checked by the stability check process to a data search platform, wherein the data search platform is loaded with the parsed raw data enriched with the combination of rigid data schema categories, stability checked, and sanity checked, wherein the unstructured watchlist data is structured and enriched in real-time or near-real time and in any language, including:
    normalizing the unstructured watchlist data into a canonical format;
    cleaning the unstructured watchlist data by removing problematic characters;
    standardizing all country and location related information to International Organization for Standardization (ISO) standard codes,
using a named entity recognition to extract identification (ID) numbers and ID types from unstructured text fields of the unstructured watchlist data;
    applying a sanity check to the unstructured watchlist data; and
    assigning each item of the unstructured watchlist data a type for entity resolution.

2. The method of claim 1, further comprising labelling, categorizing, and structuring the unstructured watchlist data.

3. The method of claim 1, further comprising:
    performing a plurality of post checks on the parsed raw data that is stability checked; and
    generating a report and updating the watchlist checksum and time stamp.

4. The method of claim 1, further comprising:
    performing a model training operation comprising the steps of:
        training a model on a subset of labeled data of the unstructured watchlist data;
        applying the model to unlabeled data of the unstructured watchlist data;
        electing a data sample of a subset of the unlabeled data for an oracle;
        classifying, via the oracle, the subset of the unlabeled data;
        labeling, by the oracle, the subset of the unlabeled data as newly labeled data; and
        consolidating the labeled data and the newly labeled data.

5. The method of claim 1, further comprising:
    activating a search engine to permit input of a plurality of search parameters to permit the user to search a watchlist for the parsed raw data that is stability checked.

6. The method of claim 1, further comprising:
    executing a data acquisition process comprising the steps of:
        uploading, via a user, a client list to the master database;
        screening names provided on the client list and displaying hits produced from searches by the user of the master database;
        classifying, via the user, the hits and a match type of the names; and
        providing, via the user, a reason for a classification and a plurality of notes; and
saving an audit record.

7. A computer system for labelling, categorizing, structuring, and enriching unstructured watchlist data, comprising:
    at least one database to receive raw data;
    a data enrichment system executed by one or more processors of the computer system to enrich the raw data with a combination of rigid data schema categories and provide a data search platform with the raw data enriched with the combination of rigid data schema categories;
    a sanity check system executed by the one or more processors of the computer system to perform a sanity check on the raw data that is enriched, wherein the raw data is structured and enriched in real-time or near-real time and in any language, including:
    normalizing the raw data into a canonical format;
    cleaning the raw data by removing problematic characters;
    standardizing all country and location related information to International Organization for Standardization (ISO) standard codes,
using a named entity recognition to extract identification (ID) numbers and ID types from unstructured text fields of the raw data;
    applying a sanity check to the raw data; and
    assigning each item of the raw data a type for entity resolution,
    a stability check system executed by the one or more processors of the computer system to receive the raw data that is sanity checked and perform a stability check; and
    a post check computer system executed by the one or more processors of the computer system to receive the raw data that is stability checked and perform a post check to generate a report and update a watchlist using the stability checked raw data.

8. The system of claim 7, further comprising a search engine to permit input of a plurality of search parameters to permit the user to search the watchlist updated with the stability checked raw data.

9. The system of claim 7, further comprising extracting identification data from the unstructured watchlist data.

10. The system of claim 7, wherein enriching the raw data includes removing noise words from the raw data.

11. A method for processing data for electronic searching, comprising:
- receiving unstructured watchlist data and calculating a watchlist checksum;
- comparing the calculated watchlist checksum to a current checksum to determine whether a change occurred in the unstructured watchlist data;
- extracting identification data from the unstructured watchlist data;
- enriching the unstructured watchlist data with a combination of rigid data schema structures;
- applying a sanity check to the enriched unstructured watchlist data for confirm an integrity of the enriched unstructured watchlist;
- applying a stability check process on the sanity checked unstructured watchlist data to detect anomalies; and
- transmitting the stability checked data to a data search platform in a searchable enriched format, the data search platform receiving the raw data enriched with the combination of rigid data schema categories, wherein the unstructured watchlist data is structured and enriched in real-time or near-real time and in any language, including:
  - normalizing the unstructured watchlist data into a canonical format;
  - cleaning the unstructured watchlist data by removing problematic characters;
  - standardizing all country and location related information to International Organization for Standardization (ISO) standard codes, using a named entity recognition to extract identification (ID) numbers and ID types from unstructured text fields of the unstructured watchlist data;
- applying a sanity check to the unstructured watchlist data; and
- assigning each item of the unstructured watchlist data a type for entity resolution.

* * * * *